United States Patent
Almomani et al.

(10) Patent No.: US 10,176,687 B2
(45) Date of Patent: Jan. 8, 2019

(54) SMART LOCK FOR HOME AUTOMATION

(71) Applicant: Spectrum Brands, Inc., Middleton, WI (US)

(72) Inventors: Nedal Akram Almomani, Rancho Santa Margarita, CA (US); May Lansigan Schlatter, Irvine, CA (US); Jason Tu, Mission Viejo, CA (US); Matthew D. Lovett, Lake Forest, CA (US); Sachin Sood, Lake Forest, CA (US); Elena Gorkovenko, Mission Viejo, CA (US); Elliott Barlow Schneider, Foothill Ranch, CA (US); James Lin, Laguna Niguel, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 15/697,422

(22) Filed: Sep. 6, 2017

(65) Prior Publication Data
US 2018/0068541 A1 Mar. 8, 2018

Related U.S. Application Data

(60) Provisional application No. 62/384,284, filed on Sep. 7, 2016.

(51) Int. Cl.
| | |
|---|---|
| *E05B 45/06* | (2006.01) |
| *G08B 13/22* | (2006.01) |
| *G05B 15/02* | (2006.01) |
| *G07C 9/00* | (2006.01) |
| *G08B 21/18* | (2006.01) |
| *G08B 25/10* | (2006.01) |
| *G08B 17/10* | (2006.01) |
| *G08B 21/24* | (2006.01) |
| *G08B 3/10* | (2006.01) |
| *G08B 7/06* | (2006.01) |

(Continued)

(52) U.S. Cl.
CPC ............. *G08B 13/22* (2013.01); *G05B 15/02* (2013.01); *G07C 9/00174* (2013.01); *G07C 9/00309* (2013.01); *G07C 9/00571* (2013.01); *G08B 17/10* (2013.01); *G08B 21/182* (2013.01); *G08B 21/24* (2013.01); *G08B 25/10* (2013.01); *G05B 2219/2642* (2013.01); *G07C 2009/00357* (2013.01); *G07C 2009/00769* (2013.01); *G07C 2209/62* (2013.01); *G08B 3/10* (2013.01); *G08B 7/06* (2013.01); *G08B 7/066* (2013.01); *G08B 13/1672* (2013.01); *G08B 17/00* (2013.01); *G08B 25/009* (2013.01)

(58) Field of Classification Search
CPC ...................................................... G08B 13/22
USPC ........................................................ 340/542
See application file for complete search history.

(56) References Cited

U.S. PATENT DOCUMENTS

9,396,633 B1 * 7/2016 Sannala ............ G08B 13/19619
9,413,816 B2 * 8/2016 Kountouris .......... G08B 25/007
(Continued)

*Primary Examiner* — Santiago Garcia
(74) *Attorney, Agent, or Firm* — Merchant & Gould P.C.

(57) ABSTRACT

An electronic lock may be used to monitor and control access throughout a home. The electronic lock is preferably mounted to a main enter/exit door on the home as this provides a good point of contact for users entering and leaving the home. The electronic lock may monitor users, appliances, safety, and operation of interior doors. Access may be controlled and/or monitored by users with a mobile device or through any other similar device.

5 Claims, 8 Drawing Sheets

(51) Int. Cl.
*G08B 13/16* (2006.01)
*G08B 17/00* (2006.01)
*G08B 25/00* (2006.01)

(56) References Cited

U.S. PATENT DOCUMENTS

| | | | | |
|---|---|---|---|---|
| 9,501,915 | B1* | 11/2016 | Laska | G08B 13/19606 |
| 2014/0278281 | A1* | 9/2014 | Vaynriber | G06F 17/5004 |
| | | | | 703/1 |
| 2015/0097689 | A1* | 4/2015 | Logue | H04W 4/70 |
| | | | | 340/632 |
| 2015/0200787 | A1* | 7/2015 | Slupik | G05B 15/02 |
| | | | | 700/275 |
| 2016/0261931 | A1* | 9/2016 | Fadell | H04Q 9/00 |
| 2016/0261932 | A1* | 9/2016 | Fadell | H04Q 9/00 |
| 2016/0284206 | A1* | 9/2016 | Boettcher | G08B 29/185 |
| 2016/0365885 | A1* | 12/2016 | Honjo | H04B 1/38 |
| 2016/0374133 | A1* | 12/2016 | Logue | H04W 8/005 |
| 2017/0017214 | A1* | 1/2017 | O'Keeffe | G05B 15/02 |
| 2017/0176034 | A1* | 6/2017 | Hussain | F24F 11/30 |
| 2017/0176964 | A1* | 6/2017 | O'Keeffe | G05B 15/02 |
| 2017/0202039 | A1* | 7/2017 | Logue | H04W 76/021 |
| 2017/0205783 | A1* | 7/2017 | Tannenbaum | G05B 15/02 |
| 2017/0206273 | A1* | 7/2017 | Tannenbaum | G06F 17/30752 |
| 2017/0263111 | A1* | 9/2017 | Deluliis | H04W 4/90 |
| 2017/0287299 | A1* | 10/2017 | Shih | G08B 21/02 |
| 2017/0328995 | A1* | 11/2017 | Marschalkowski | G01S 13/878 |
| 2018/0019889 | A1* | 1/2018 | Burns | H04L 12/2807 |

\* cited by examiner

SMART LOCK FOR HOME AUTOMATION

CLAIM OF PRIORITY TO EARLIER APPLICATIONS

This application claims priority to U.S. Provisional Application Ser. No. 62/384,284 filed on Sep. 7, 2016, the entire contents of which are expressly incorporated by reference herein.

TECHNICAL FIELD

This invention relates to the field of door locks. More particularly, this invention relates to features on smart door locks. Smart door locks refers to door locks that are integrated with electronics and capable of electronic communication with other devices.

BACKGROUND OF THE INVENTION

Door locks are commonly installed in residential and commercial settings. There are many different types of door locks used throughout the residential and commercial settings as well. It is common to have at least one Deadbolt installed on the front door. Interior doors may have deadbolts and/or other types of locks installed.

Door locks are already routinely used to simply lock a door. As technology progresses, there has been a growing trend to improve door locks by adding electronics thereby allowing a user to locally or remotely operate and monitor the lock thereby creating what has been dubbed "smart" locks.

When designing and manufacturing smart locks housings or chassis are often required to house the electronics. As technology progresses, the electronic components are shrunk in size and chassis and housings are capable of holding more and more electronics, thereby having increased capacity in the same or smaller volumes.

What is therefore needed is an improved smart lock that does more than simply lock and unlock a door. What is needed is a smart lock that has added integrated features that may or may not be related to the operation of the lock. For example, the smart lock may include various electronic components/devices allowing it to keep track of occupancy, status of the dwelling, status of the environment, and particular needs of the user. This information may be communicated to the user via displays on the lock, mobile App, smart home system or other means. Finally, what is needed is a smart lock capable of performing a multitude of tasks thereby functioning as a personal assistant to the user.

OBJECT OF THE INVENTION

When a user approaches a dwelling, be it single family, multi-family, commercial, or residential, an electronic lock is typically the first device the user interacts with. Similarly, the electronic lock is the last thing a user interacts with when leaving the dwelling. As a result, a smart, electronic lock is a good information reference point for status updates to events occurring within the dwelling.

The electronic lock may be used as a reminder/warning device to communicate to the user as they enter/leave that a certain pre-established condition exists in the home. Of particular use is the communication of conditions that could pose a hazard to the home/danger to the occupants. Examples of these conditions include dangerous appliances being left on (some examples—curling iron, iron, stove) or the detection of water running that could pose a potential flooding issue.

In addition to attempting to avert potentially dangerous/damaging conditions, the system could be used to alert the user to merely undesirable conditions (i.e. the last person is leaving the house and there are lights left on—promoting energy conservation). Integrating these capabilities into the electronic lock allows the user to be alerted at the point of entry/exit without the need for a smart device (i.e. phone). Having a tangible alert from a part of the home's existing infrastructure is more natural than having to interact with a hand-held smart device.

The invention also seeks to provide a way to help occupants locate and reach an exit in the event of an emergency situation. The electronic lock will help occupants locate and operate the nearest exit door to help them reach safety by providing visual and/or auditory guides. The indications could be through sirens/beeps/voice direction and/or visually through colored lights/animations. The solution can be applied to both exterior doors as well as interior doors. Interior doors could be programmed so that any door leading to an exit door would provide one type of indication (indicating to proceed through the door toward an exit) and a door that does not lead to an exit (i.e. a closet door) could provide a different type of indication (used strictly for orientation to locate another door leading to an exit). Additionally, if the electronic lock is so equipped, it could provide alerts based on any potential hazards that may exist on the other side of the door (elevated temperatures, poor air quality, etc.).

The electronic lock could be configured to either communicate to proceed with caution (if this is the only way out or the way out with the best conditions) or it could direct the user to a safer way out based on conditions. The situation may (but does not have to) involve limited visibility due to dark/smoke/etc. After being configured the locks would automatically act in sync with connected smoke/fire/carbon monoxide detectors either directly or through a hub/gateway. This means that they would automatically provide alerts and be silenced in conjunction with the hazardous condition detectors. The lock owner could optionally configure the locks to automatically lock/unlock in addition to providing the way-finding indications.

BRIEF DESCRIPTION OF DRAWINGS

The present disclosure will be described hereafter with reference to the attached drawings which are given as non-limiting examples only, in which.

DETAILED DESCRIPTION

Figure 1:
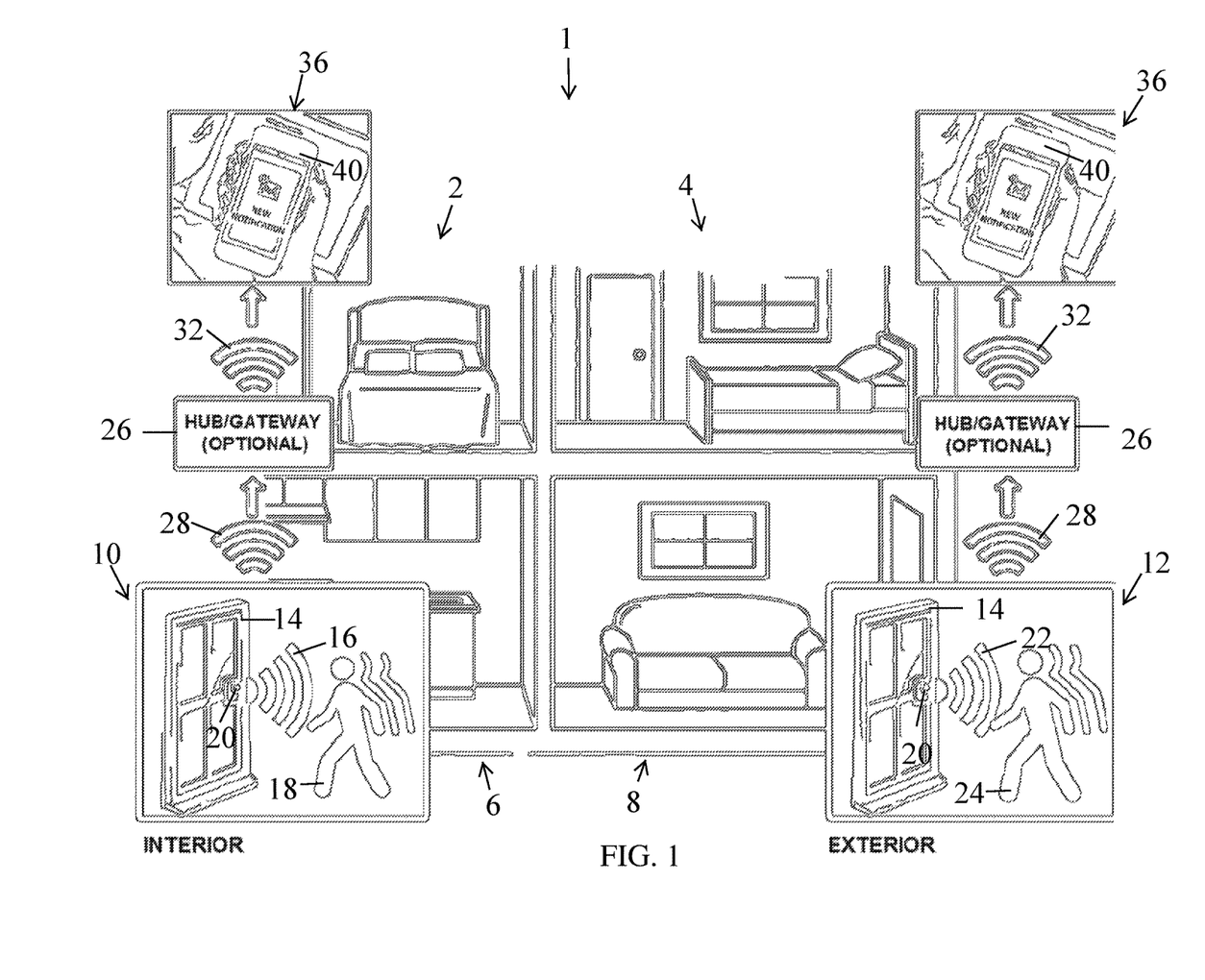
FIG. 1 shows an interior cross section view of a smart home with an electronic lock according to an embodiment of the invention.

FIG. 1 shows a smart home 1 according to one embodiment of the invention. The smart home 1 is equipped with a number of rooms, namely a first bedroom 2, a second bedroom 4, a kitchen 6, and a living room 8. The smart home 1 has an electronic lock 20 on the front door 14. The electronic lock 20 transmits a signal 16 on the interior side 10 of the front door 14 that senses an approaching user 18. The electronic lock 20 similarly transmits a signal 22 on the exterior side 12 of the front door that senses an approaching user.

The electronic lock 20 can therefore monitor all users, either approaching 18 on the interior side 10 or approaching 24 on the exterior side 12, that enter and exit the smart home 1. The monitoring may be performed by integrating various tracking devices, for example electronic sensors like motion sensors, within the smart lock. The electronic lock may also communicate with other electronic sensors within the home, or operate independently. If communicating with other electronic sensors, such as security systems or automation systems within the home, the electronic lock 20 can poll all electronic sensors and determine if there are users present within the dwelling.

Should an unauthorized user attempt to enter or tamper with the electronic lock 20, an alert may be transmitted and/or an alarm activated. Another alert or alarm may be activated should an unauthorized user bypass the door lock and gain entry to the dwelling. This may be sensed through motion sensors within the smart home 1 or with other known sensors on windows or doors.

Armed with the information of users present within the smart home 1, the electronic lock 20 can arm an alarm system installed in the smart home 1 when the last person exits the smart home. This is possibly by tracking all who enter the smart home 1 through the front door 14 using the signal 22 and signal 16 and also tracking all occupants that exit the smart home 1 through the front door with the signal 16 and signal 22.

The electronic lock 20 can also determine and communicate which doors are locked, unlocked or in use, and also communicate what users are present within the dwelling, as well as each room. This may be accomplished by interacting with each user as they enter and exit the smart home 1 as described above. The electronic lock 20 may scan smart devices such as cell phones or electronic identification tags to identify users. Alternatively, the electronic lock 20 can communicate with video and/or audio with the entering and exiting users and communicate their respective occupancy status.

The communication of occupancy status to a user may be secure and transmitted directly to the user through any wireless technology capable of transmitting data. This may include, but is not limited to, smart watches, smart phones, email, text messages, or the like. Alternatively, the electronic lock 20 may use audio and video directly through the electronic lock or a connected media device to communicate the information. For example, a hub 26 may be used in the smart home 1. The hub 26 can be used to receive communication 28 from the electronic lock 20 to the hub 26. The hub can then transmit communication 32 from the hub 26 to any user. Users may interact 36 with the communications 32 from the hub 26 with a mobile device 36.

Figure 2:
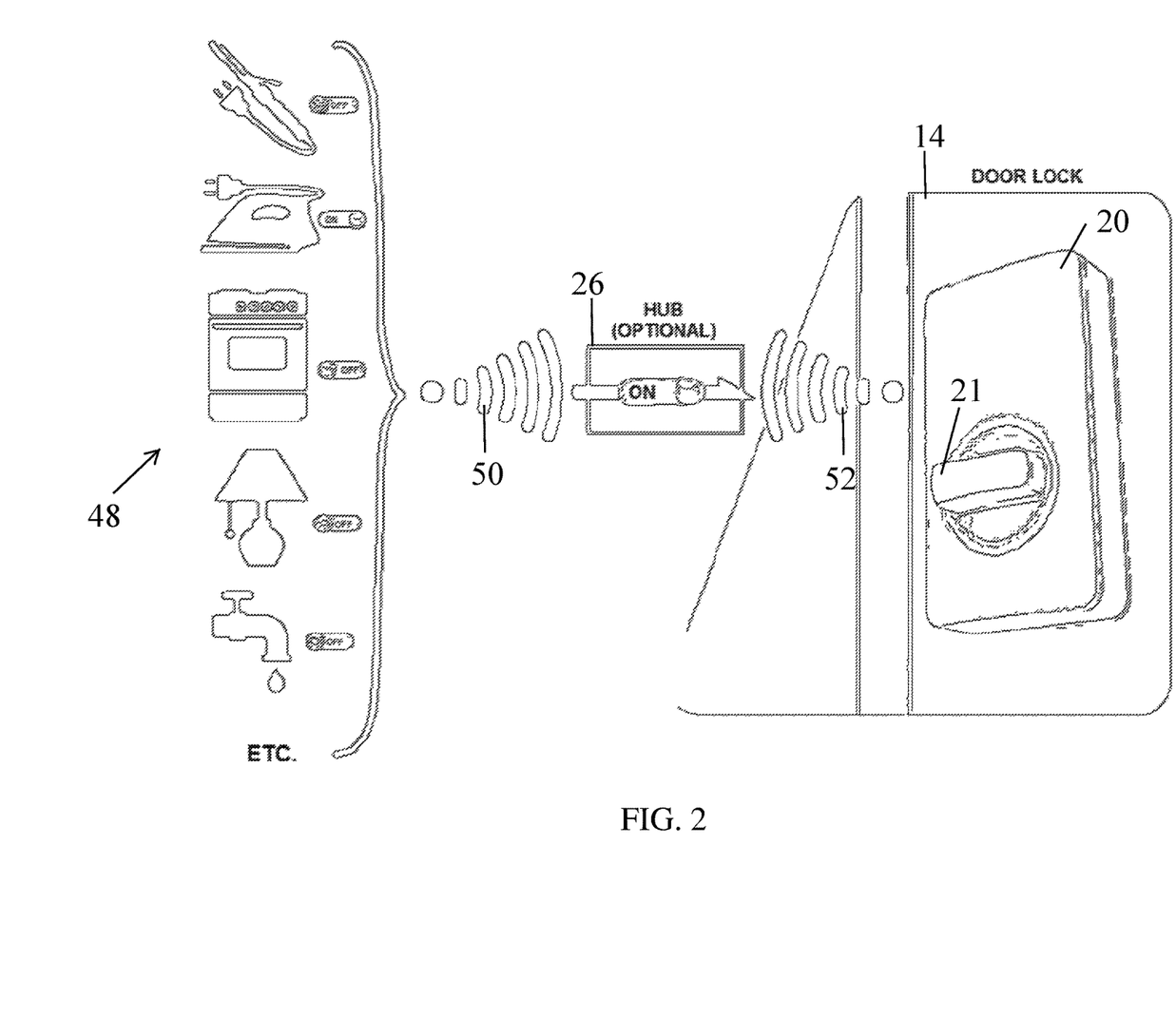
FIG. 2 shows a representative diagram of an electronic lock according to an embodiment of the invention monitoring household appliances.

As shown in FIG. 2, the electronic lock 20 can also be integrated to communicate with any power-consuming products (both electric and natural gas), such as household appliances 48, throughout the smart home 1 such as stove, oven, refrigerator, HVAC equipment, coffee pot, fireplace, water pump, hair iron, clothes iron, and the like. The communication may be conducted through integrated technology within the respective household appliance 48, or through technology integrated into the smart home 1, such as a hub 26. For example, power outlets may be dedicated for certain devices such as a refrigerator, washing machine, hair dryer, or other large/small household appliances 48.

Electronics may be integrated into the power circuit or added to the outlet, via plug adapters in communication either directly with the electronic lock 20 or through the hub 26. The household appliances 48 may then communicate 50 electrical usages to the hub 26 which then communicates 52 to the electronic lock 20. The door lock may then track that the particular household appliance 48 in use and also monitor the amount of power consumed. The electronic lock 20 can also alert the user what and/or if any household appliances 48 are in use when the user leaves the dwelling, approaches the door 14 or electronic lock 20, or operates the thumb turn 21. A power consumption threshold may also be defined as some items may be designed to constantly draw a limited amount of power, i.e., a clock on an oven.

The threshold may be set such that alert is only transmitted if a greater amount of power is being consumed such as in oven heating. This type of alert can prevent not only wasted energy, but also prevent fires or other harmful scenarios. Often times fires, floods, or other damage is incurred by forgetting to turn off household appliances 48. By having the alert on the door 14 or electronic lock 20, the main point of entry and exit into/out of the smart home 1 is used as the last point of communication.

Figure 3:
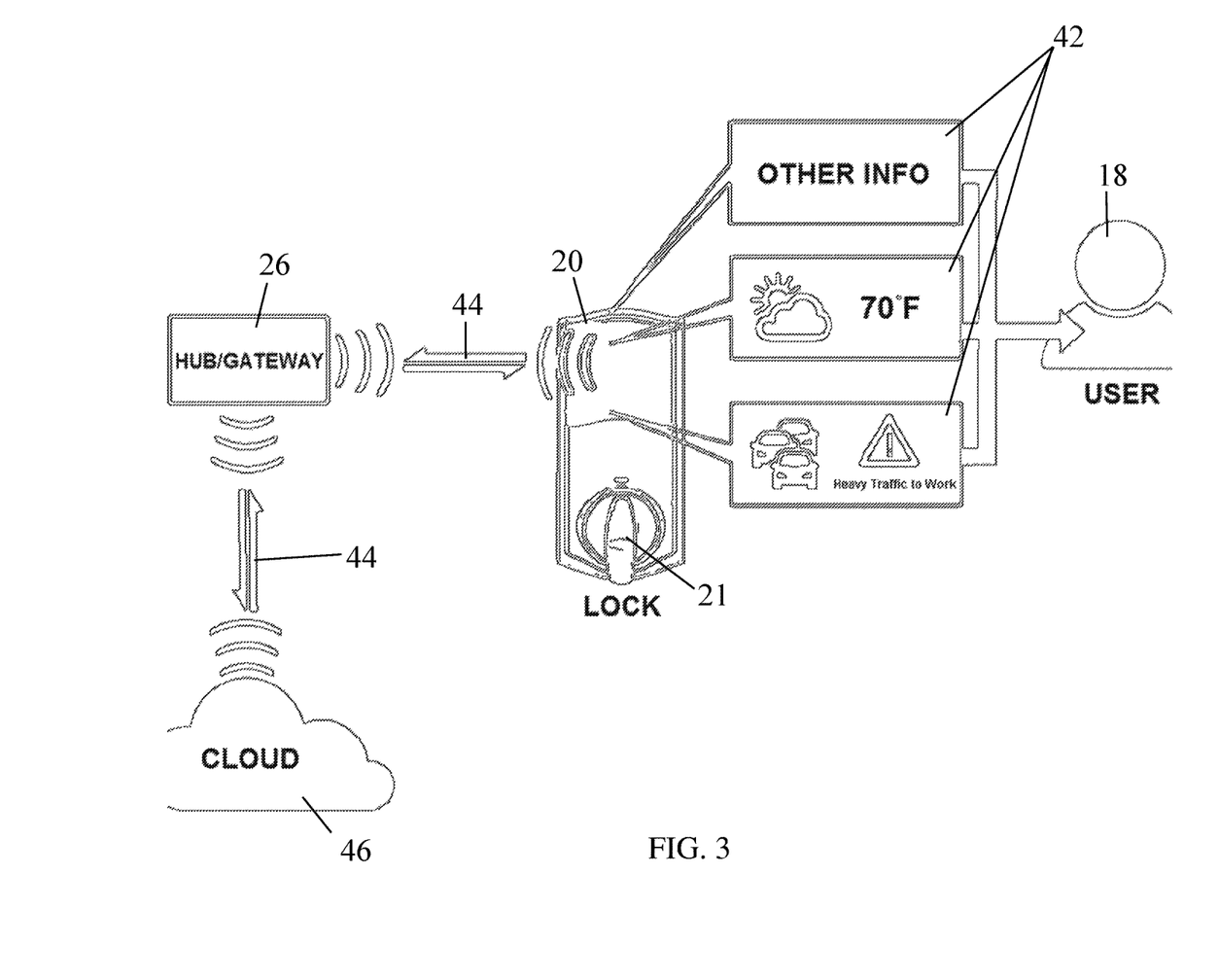
FIG. 3 shows a representative diagram of an electronic lock according to an embodiment of the invention used to relay information from a cloud service to a user.
Figure 4:
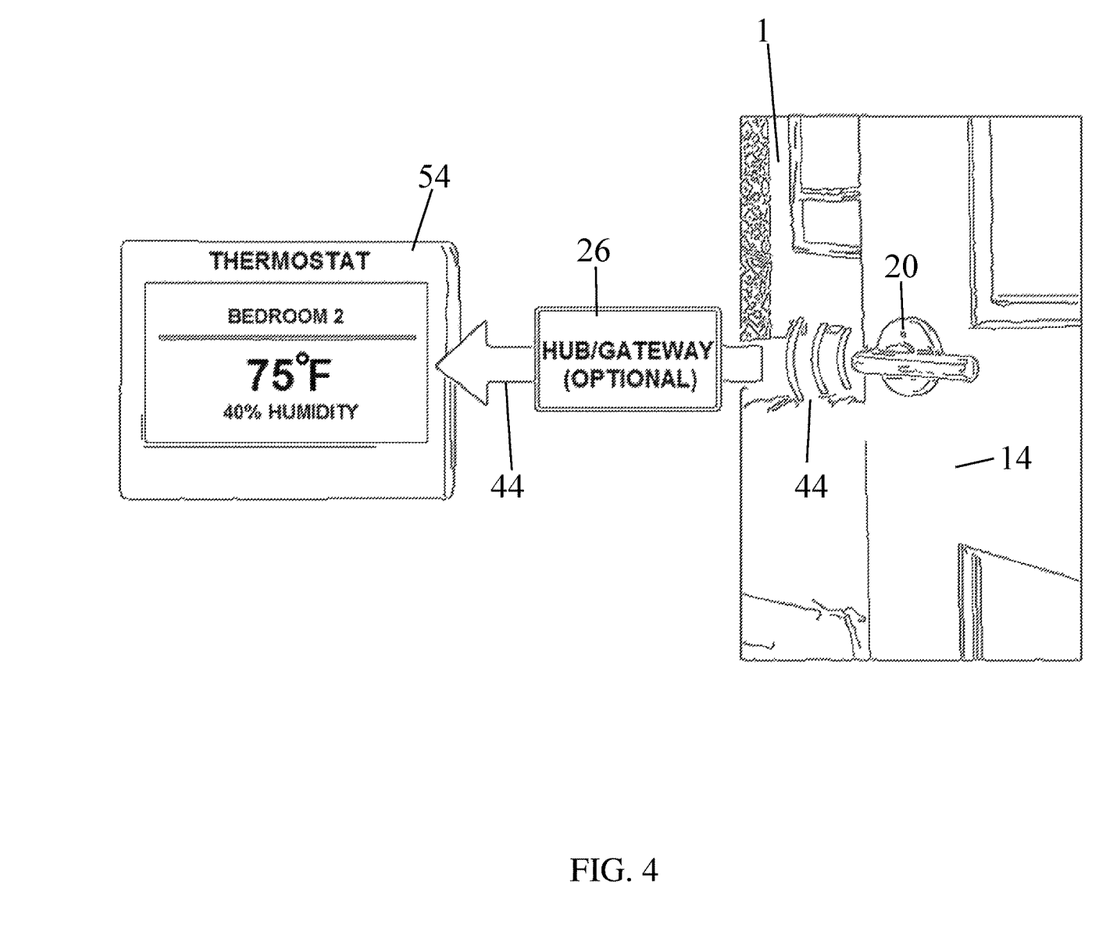
FIG. 4 shows a representative diagram of an electronic lock according to an embodiment of the invention communication with a thermostat.

Transitioning now to FIG. 3 and FIG. 4, the electronic lock 20 may also communicate, with two-way communication 44, with other devices external to the smart home 1 through the use of a hub 26 and internet/cloud data 46. These external devices may provide information 42 relating to weather, traffic, temperature, humidity, and the like to a user 18. The electronic lock 20 may also use a cell phone in the user's 18 possession as a hub to download this information 42, or, it may log on to a cloud service through the internet to gather this information.

The electronic lock 20 may communicate this information to the user though a cell phone, monitor, or other display device. A thermostat 54 may also be used as smart-thermostats commonly have screens. The information from the electronic lock 20 may be displayed on the thermostat and thereby avoid the need of an additional monitor/screen. The electronic lock 20 may also be integrated with on-board sensors to perform these functions or may communicate via wired/wireless connections with other sensors.

By monitoring users that frequently enter and exit the smart home 1, or pass through the door 14, the electronic lock 20 is capable of self-learning who is an authorized user 18 and who is not authorized to enter. Authorization may be done through known technologies including technologies disclosed in U.S. Pat. No. 9,390,572 and in U.S. application Ser. No. 14/689,766, the entire contents of which are expressly incorporated by reference herein. Authorization may also be done through audio/video recognition or authentication.

A user 18 may also monitor how many occupants are within the dwelling and also monitor the identity of each occupant. This may be accomplished by communicating with the electronic lock 20 and receiving information regarding door 14 access that has been granted as well as receiving information from other sensors within the home. In fact, every door within the smart home 1 may include a similar electronic lock 20 that all communicate with one another. The electronic lock 20 may then track users 18 that enter rooms as each door would be a controlled and monitored access point.

Figure 5:
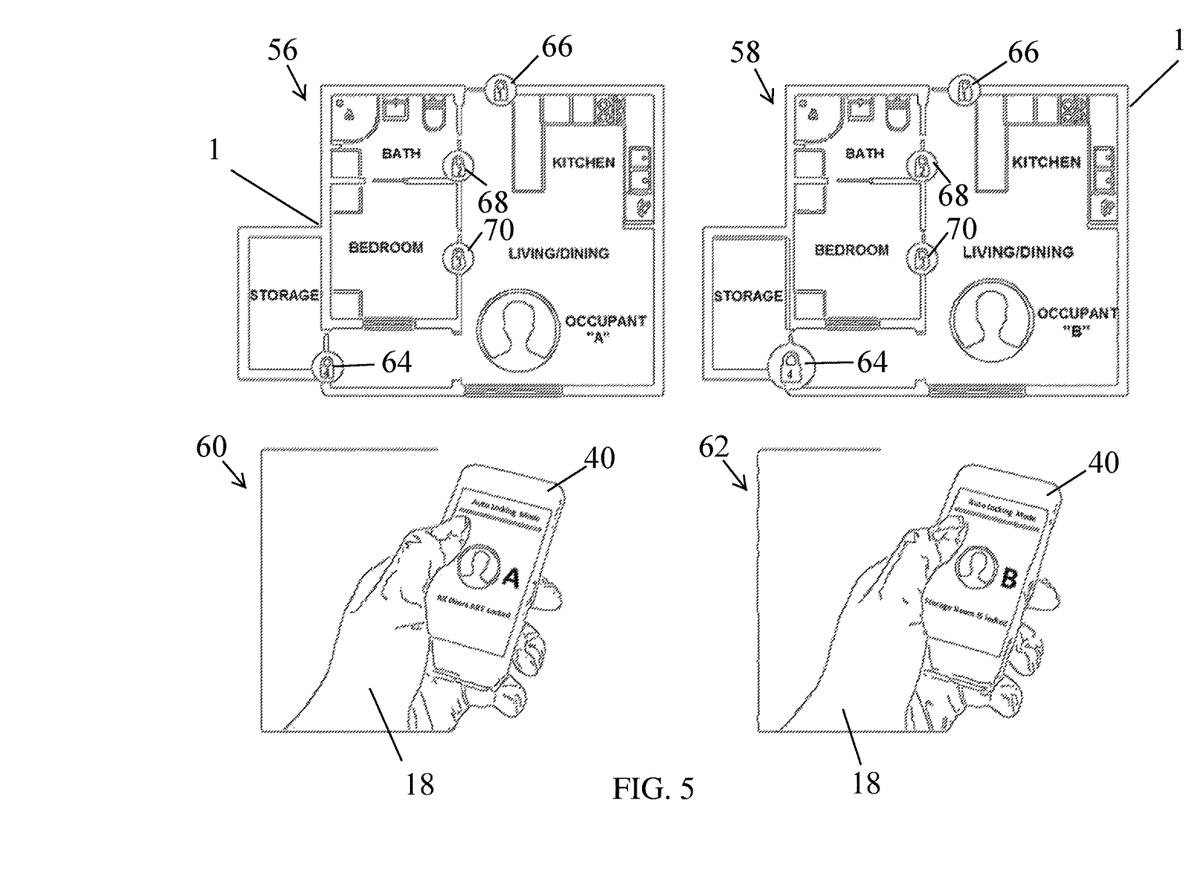
FIG. 5 shows a representative diagram of an electronic lock according to an embodiment of the invention used to monitor and track user activity within a smart-device equipped home.

Moving on to FIG. 5, different users 18 may be given different access within the smart home 1. For example, a child 62 may be given access to a bedroom door 70, but not to a bathroom door 68. The child 62 may monitor and track this access though a mobile device 40, such as a smart phone or the like with limited control. As discussed above, access may be controlled through known devices such as RFID tags, smart phone authentication, video scans, and the like. Each door, 64, 66, 68, and 70, may scan and track access through such devices.

An adult 60, or master user, may also track all users 18 and be able to grant/restrict access to certain doors 64, 66, 68, 70. This access may be modified and tracked similarly through a mobile device 40. As a result, one user 18 (adult 60) may have a unique access view 56 that is different than another user's 18 (child 62) access view 58.

Figure 6:
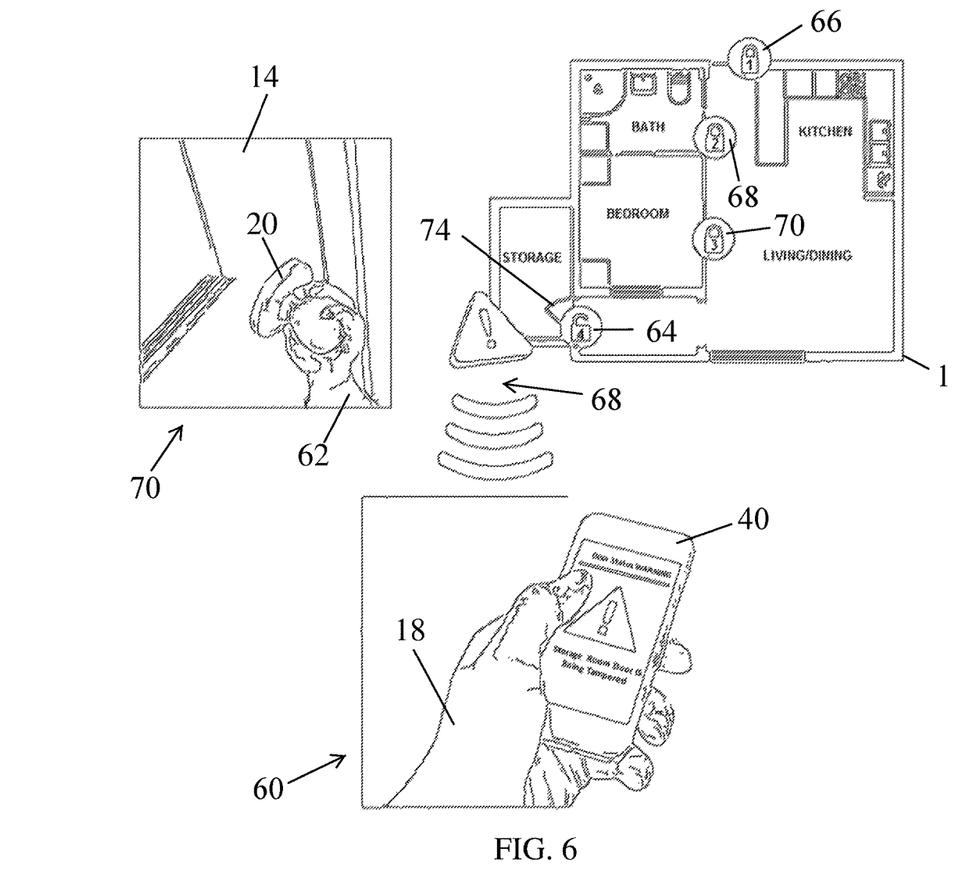
FIG. 6 shows a representative diagram of an electronic lock according to an embodiment of the invention used to issue alerts and notifications regarding controlled access within the smart home.

For example, FIG. 6 shows a situation in which the child 62, with limited access is attempting access 70 through a door 14 by activating the electronic lock 20. This attempted access prompts the electronic lock 20 to send an alert 68 to the master user, (adult 60) on a mobile device 40. The alert 68 identifies the door 74 that is being operated by the child 62 without proper authorization. The electronic lock 20 may simply issue the alert 68, and/or it may lock and prevent the unauthorized access.

Sensors associated within door locks can be used as tracking devices to monitor if activation of the sensor is off a typically occurring routine. This particularly will benefit monitoring minors/seniors and a notification or alert may be generated if the door is being used outside of this routine.

Figure 7:
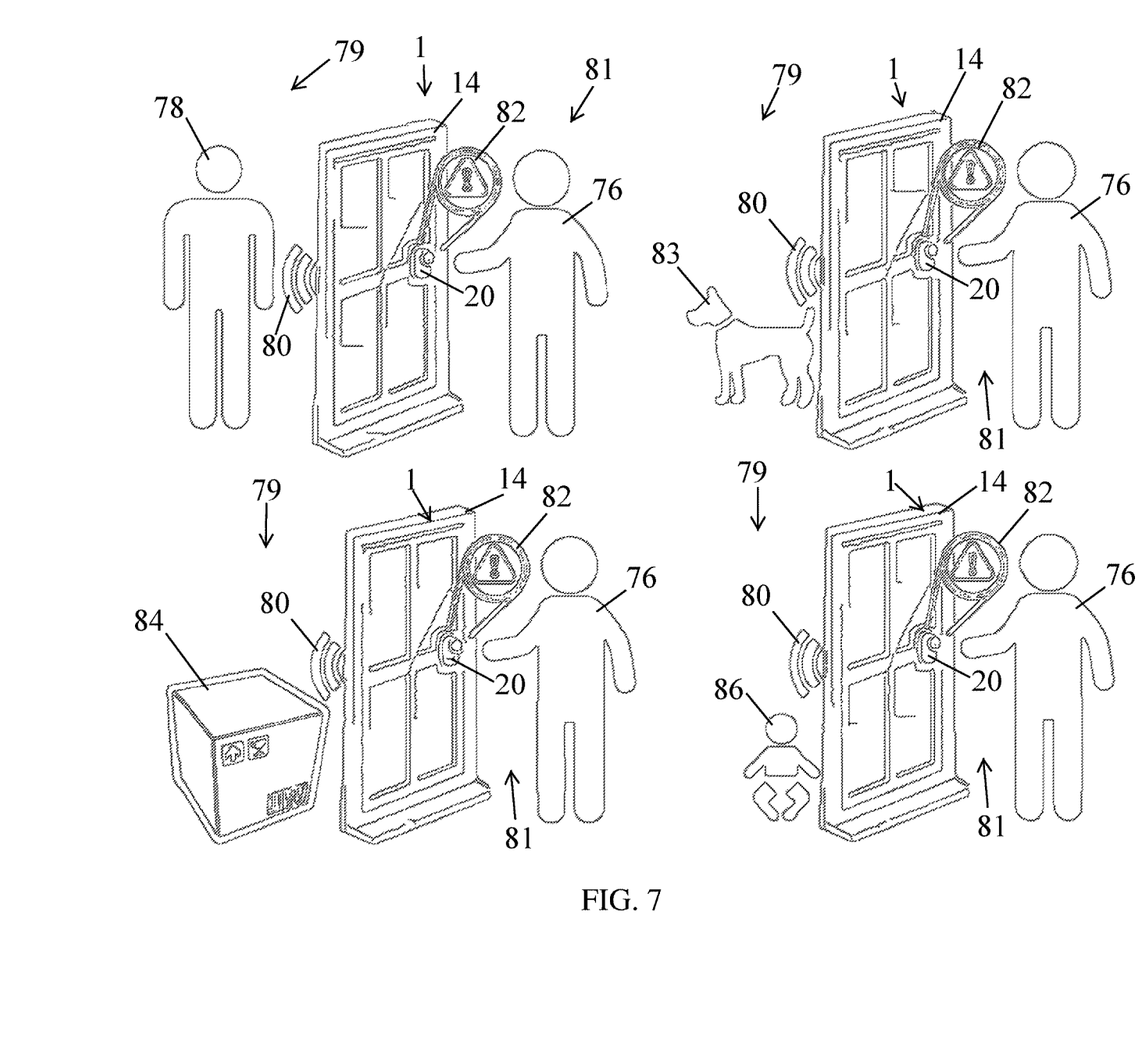
FIG. 7 shows a representative diagram of an electronic lock according to an embodiment of the invention used to monitor and give notifications regarding activity on the exterior of the smart home.

Tracking access and restricting access may also be done on the outside of the smart home 1, as shown in FIG. 7. An interior user 76, on the interior side 81 of the smart home 1, may receive an alert 2 from the electronic lock 20 when something approaches on the exterior side 79 of the door 14. This alert 82 may be in the form of an audible alert, such as a speech alert, a visual alert, such as a light or logo, or may simply be transmitted to a mobile device.

The electronic lock 20 is preferably equipped with external sensing 80 that scans the exterior side 79 of the door 14. The external sensing 80 may use a camera and visual recognition to determine what is on the exterior side 79. For example, an external user 78, a pet 83, a delivered package 84, and a child 86 may all be sensed. One additional way in which differentiation of person/object on the exterior side 79 may be accomplished is through electronic tags such as RFID tags or the like. These electronic tags may be distributed to known parties such as package couriers, pet collars, bracelets for children, or the like. When an object is presented on the exterior side 79 of the door 14 that does not have any such electronic tag, a unique alert may be generated signaling an unknown object is approaching.

Figure 8:
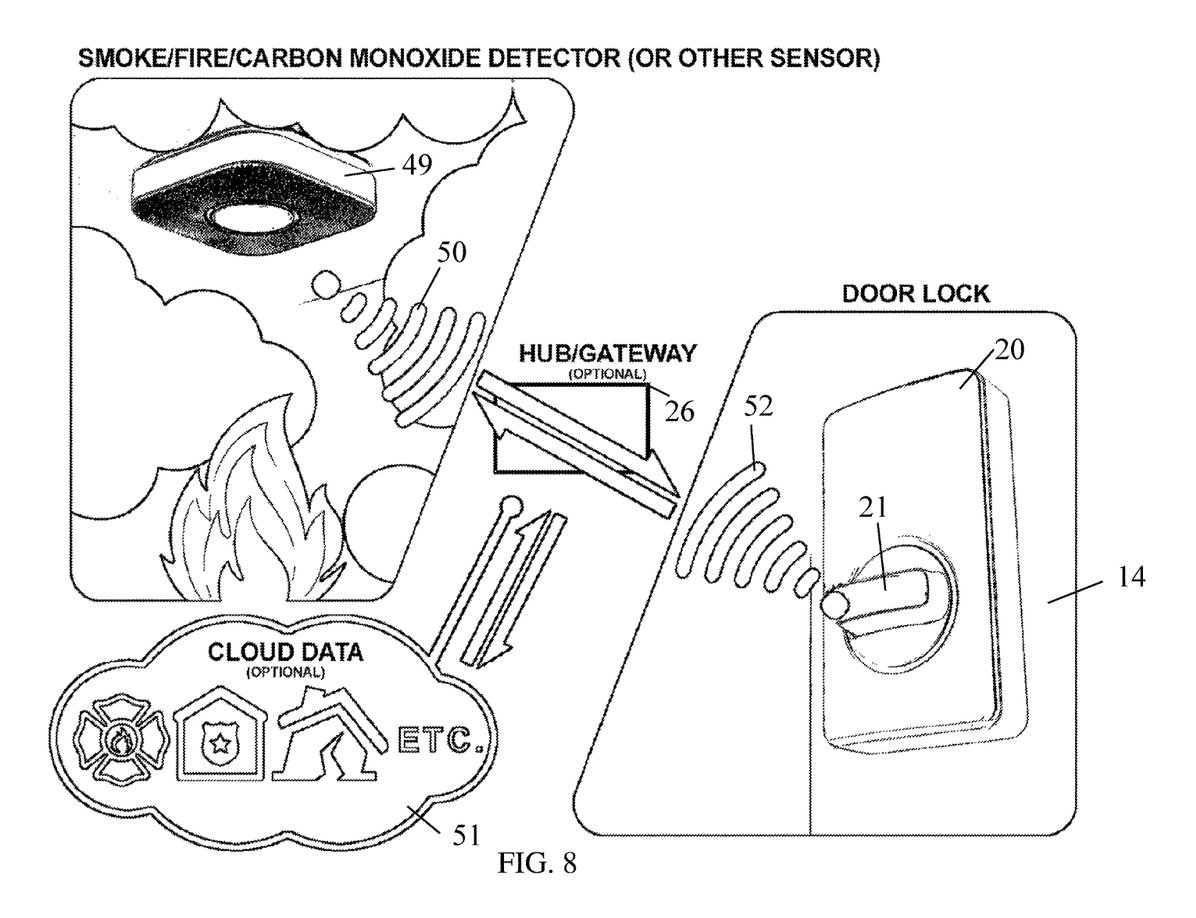
FIG. 8 is a representative diagram of an electronic lock according to an embodiment of the invention used to monitor and report on safety and health hazards within the smart home.

As shown in FIG. 8, various sensing technology may also be used so the electronic lock 20 monitors if there are any health/safety hazards. Health and safety hazards may include fire, smoke, carbon monoxide, breaking glass, or other injury-inducing events that are capable of being sensed with electronic sensors. Injury may be detected by monitoring for certain sounds such as breaking glass, loud yelling, crying, or other activities. Should the electronic lock 20 sense the hazard, it can activate escape and/or emergency mode. This mode may include unlocking all doors 14 within the smart home and guiding occupants to the exit by emitting audio, light or other signals.

The electronic lock may receive information from either a hub/gateway 26, connected outlets/adaptors within the home, or from connected devices themselves. If any established undesirable condition exists when the electronic lock 20 is activated via the thumb turn 21, the electronic lock can communicate the existence of said condition through an audible and/or visual alert. The alert can be in the form of a visual indication (light/screen/etc.), audible indication (sound/speech/etc.), or tactile indication (vibration). The alert could be specific (i.e. speech indicating that there is a fire in the kitchen) or more generic (i.e. a red light indicating that one of any number of conditions has been met that should trigger an alert) depending on the capabilities of the specific lock/system. If the electronic lock 20 has the capability to track home occupancy, the electronic lock 20 logic could be programmed so that conditions are established based on both hub 26 device status and home occupancy (i.e. an alert is triggered only when the stove is on and the last person is leaving the house).

Additionally, during the event of a health/safety hazard, a smoke/fire/carbon monoxide sensor 49 can detect the presence of such a hazard. The particularly unique frequency of the audible tone from the sensor 49 may automatically trigger an event on the electronic lock 20 to issue an alert such as the above mentioned. Alternatively, the sensor 49 may communicate 50 to a hub 26 and the hub 26 can relay that information with communication to the electronic lock 20.

In such a situation, the electronic lock 20 may track all occupants within the home and give notification to users as they pass through the door 14 of the identities of all users remaining within the home. Emergency personnel may also be contacted automatically by linking either the electronic lock 20 or the hub 26 to emergency cloud data 51. When linked to the cloud 51, emergency responders may be automatically notified of the emergency situation. Additionally, the electronic lock 20 can send an alert to emergency responders regarding not only the emergency situation, but also all occupants currently within the home.

The electronic lock 20 may also serve as a beacon or way-finder for occupants within the home. The electronic lock may emit a strobe light, laser light, or any other kind of light to signal to occupants where the exit is located. In times of distress and when smoke/fire is present, it may be difficult to locate the door 14. An emergency way-finding feature may assist occupants in finding the exit. The electronic lock may also emit audible warnings prompting occupants to exit during a sensed emergency. As occupants exit through the door 14, the electronic lock may inform them the identity and/or number of occupants within the home.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:

1. A method of communicating activity in proximity of a dwelling comprising the steps of:
   providing an electronic lock on a main entry door of a dwelling;
   providing a plurality of electronic sensors each within one of a plurality of rooms within the dwelling, wherein each electronic sensor is configured to sense at least one of motion, door lock status, and door position;
   forming a wireless network with each one of the plurality of electronic sensors and the electronic lock;
   establishing wireless, electronic communication between the electronic lock and the plurality of electronic sensors within the wireless network;
   connecting the wireless network to a mobile computing device assigned to an authorized user;
   enabling the electronic lock to communicate a status of each electronic sensor to the authorized user;
   authorizing at least one mobile computing device assigned to an additional user to the wireless network;
   monitoring with the electronic lock an interaction of each one of the mobile computing devices assigned to additional users with the plurality of electronic sensors; and
   sending a wireless message containing information regarding the interaction of each one of the mobile computing devices with the plurality of electronic sensors from the electronic lock to the authorized user;
   assigning a unique permission to each one of the additional users, wherein the unique permission includes authorization to enter a predetermined selection of the plurality of rooms; and
   generating a warning alert from the electronic lock to the authorized user when the additional user is in a room not included in the unique permission.

2. The method of communicating activity in proximity of a dwelling according to claim 1, wherein the wireless network includes at least one of Bluetooth, WiFi, Near Field Communication (NFC), and a cellular network.

3. The method of communicating activity in proximity of a dwelling according to claim 1, wherein the warning alert includes transmitting a message to the mobile device.

4. The method of communicating activity in proximity of a dwelling according to claim 1, wherein the warning alert includes at least one of a visual alert and an audible alert.

5. The method of communicating activity in proximity of a dwelling according to claim 1, wherein the unique permission assigned to the additional users may be revoked and assigned with the mobile device by the authorized user.

* * * * *